United States Patent [19]

Olson

[11] Patent Number: 5,031,354
[45] Date of Patent: Jul. 16, 1991

[54] INSECT TRAPPING DEVICE

[75] Inventor: Earle L. Olson, Medina, Ohio

[73] Assignee: Olson Products, Inc., Medina, Ohio

[21] Appl. No.: 462,055

[22] Filed: Jan. 8, 1990

[51] Int. Cl.$^5$ ............................................. A01M 1/14
[52] U.S. Cl. ............................................... 43/114
[58] Field of Search ................ 43/114, 107, 108, 116, 43/132.1

[56] References Cited

U.S. PATENT DOCUMENTS

| | | |
|---|---|---|
| 402,870 | 5/1889 | Trenner . |
| 469,021 | 2/1892 | Smith . |
| 476,087 | 5/1892 | Smith ................................. 43/114 |
| 569,083 | 10/1896 | Belknap . |
| 1,087,058 | 2/1914 | Zielfeldt ............................. 43/114 |
| 1,112,064 | 9/1914 | Gordon ............................... 43/114 |
| 1,814,471 | 7/1931 | Grove . |
| 2,143,043 | 1/1939 | Wexler ................................ 43/108 |
| 2,264,875 | 12/1941 | Greuling .............................. 43/114 |
| 2,389,870 | 11/1945 | Reevely ............................... 47/57.5 |
| 2,911,756 | 11/1959 | Geary ................................. 43/114 |
| 3,398,478 | 8/1968 | Pearsall .............................. 43/114 |
| 3,653,145 | 4/1972 | Stout .................................. 43/131 |
| 3,816,956 | 6/1974 | Sekula ................................ 43/114 |
| 3,826,036 | 7/1974 | Neugebauer ........................ 43/131 |
| 4,031,654 | 6/1977 | Gray .................................. 43/114 |
| 4,048,747 | 9/1977 | Shanahan et al. .................. 43/114 |
| 4,133,137 | 1/1979 | van Adelsberg .................... 43/114 |
| 4,244,134 | 1/1981 | Otterson ............................. 43/58 |
| 4,400,909 | 8/1983 | Reese ................................. 47/2 |
| 4,800,671 | 1/1989 | Olson ................................. 43/108 |
| 4,802,302 | 2/1989 | Alnafissa ............................ 43/114 |
| 4,829,702 | 5/1989 | Silvandersson ..................... 43/114 |
| 4,876,823 | 10/1989 | Brunetti ............................. 43/114 |

FOREIGN PATENT DOCUMENTS

| | | | |
|---|---|---|---|
| 191039 | 10/1907 | Fed. Rep. of Germany ........ 43/114 |
| 16529 | of 1893 | United Kingdom . |
| 406282 | 2/1934 | United Kingdom ................. 43/114 |

Primary Examiner—Kurt Rowan
Attorney, Agent, or Firm—Reese Taylor

[57] ABSTRACT

An insect trapping device for mounting on a horizontal surface includes an elongate, flexible body having first and second surfaces and a quantity of insect attracting adhesive disposed on the first surface thereof. Attachment members in the form in the preferred embodiment of pressure-sensitive adhesive pads are secured to the opposed ends and a layer of release material is superimposed over the first surface and over the pressure-sensitive adhesive and the insect attracting adhesive. When in use, the device is flexed so that the opposed ends are brought into juxtaposition with each other and whereby the pressure-sensitive adhesive on the one end may attach to the support surface and on the other end may attach to the second surface of the body so as to mount the device in vertically projecting relationship with respect to the support surface.

9 Claims, 1 Drawing Sheet

INSECT TRAPPING DEVICE

BACKGROUND OF THE INVENTION

This invention relates in general to articles or devices for trapping insects, such as flies, and relates in particular to such a device intended to be sold and stored in a flat condition and temporarily mounted on a horizontal surface, such as a table.

DESCRIPTION OF THE PRIOR ART

It has long been known that insects can be controlled and destroyed by providing strips of material which include a coating of insect attracting and trapping adhesive. The insects are attracted either by scents impregnated into the adhesive or by the color of the material on which the adhesive is deposited or both, with the result that the insects become trapped by the material and ultimately die.

In general, this art is quite old, going back to what was once called fly paper, and strips of that type of material can be seen, for example, in Stout U.S. Pat. No. 3,653,145. Variations of this general concept can also be seen in Trenner U.S. Pat. No. 402,870; Geary U.S. Pat. No. 2,911,756; and Neugebauer U.S. Pat. No. 3,826,036, as well as British Specification No. 16,529.

It has also been known in the prior art that trapping devices of this general nature can be applied to various surfaces in contrast to being simply suspended from a ceiling or the like.

One example of such a specialized application of the general concept is applying treated bands to trees, for example, as can be seen in Belknap U.S. patent application Ser. No. 569,083; Grove U.S. Pat. No. 1,814,471; Wexler U.S. Pat. No. 2,143,043; Reevely U.S. Pat. No. 2,389,870; Reese U.S. Pat. No. 4,400,909; and Olson U.S. Pat. No. 4,800,671.

It has also been known in the prior art to attach material or devices containing the insect trapping material to vertical surfaces, such as walls or windows. Examples of such applications can be seen in Shanahan U.S. Pat. No. 4,048,747 and Silvandersson U.S. Pat. No. 4,829,702.

While the prior art just referred to is presumably effective for the purposes for which it is designed, it is believed desirable to provide a further targeted device for use on substantially horizontal surfaces. For example, it is well-known that many insects, and particularly flies, are attracted to food service installations.

In addition to the health concerns generated thereby, the presence of any substantial quantity of flies in such a setting is annoying and displeasing to customers. Spraying is, of course, objectionable for obvious reasons, and the usual screening of doors and windows is often less than satisfactorily effective.

Therefore, it is a desirable object to provide an insect trapping device which can be temporarily mounted on horizontal surfaces, such as table tops, when the establishment is closed and which will attract and destroy flying insects without, in any way, contaminating the surface on which it is disposed.

SUMMARY OF THE INVENTION

It accordingly becomes a principal object of this invention to provide an insect trapping device capable of being removably mounted on a substantially horizontal support surface.

In furtherance of the principal object, it has been found that object may be achieved by providing a flexible body capable of being flexed so as to bring the opposed ends thereof into juxtaposition so that they may be attached to the supporting surface.

It has been found that the opposed ends of the body can be provided with attachment means in the form of, for example, pressure sensitive adhesive, so that they may be attached to each other and to the support surface.

It has also been found that, by providing a quantity of insect attracting adhesive on the body adjacent its midpoint, the adhesive will be effective to attract and destroy the insects, but will be prevented from contact with the support surface in the event of accidental dislodgement once the ends are joined together.

Accordingly, production of an improved insect trapping device of the character above-described becomes the principal object of this invention with other objects thereof becoming more apparent upon a reading of the following brief specification considered and interpreted in view of the accompanying drawings.

BRIEF DESCRIPTION OF THE PREFERRED EMBODIMENTS

Figure 1:
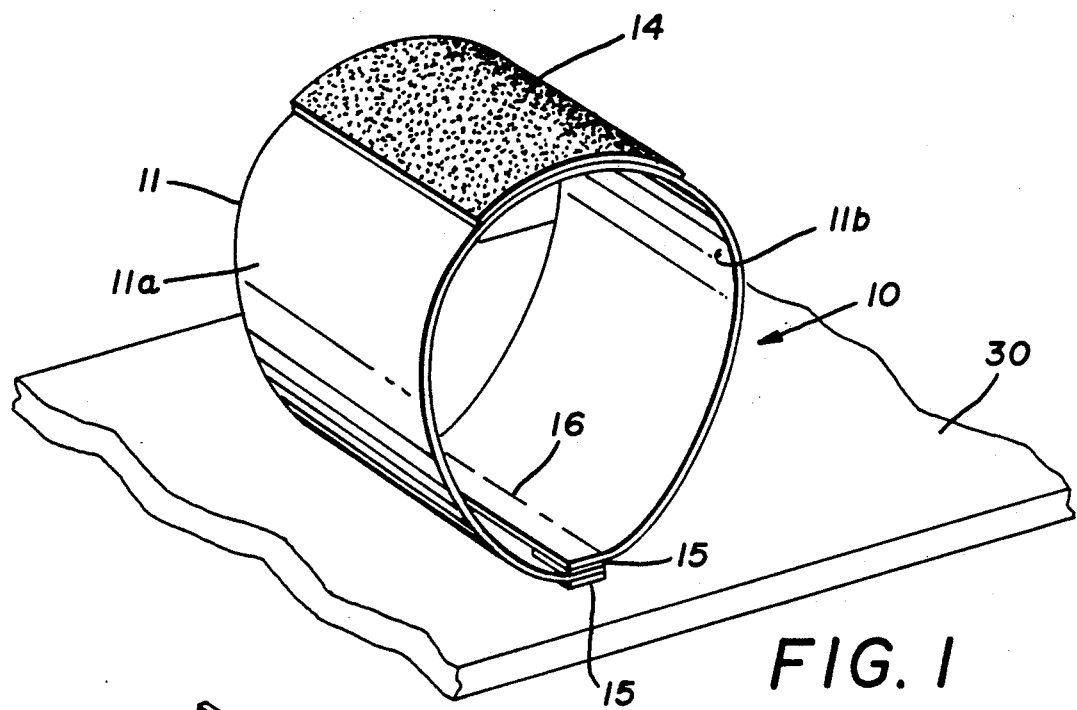
FIG. 1 is a perspective view of the improved insect trapping device in place on a supporting surface.
Figure 2:
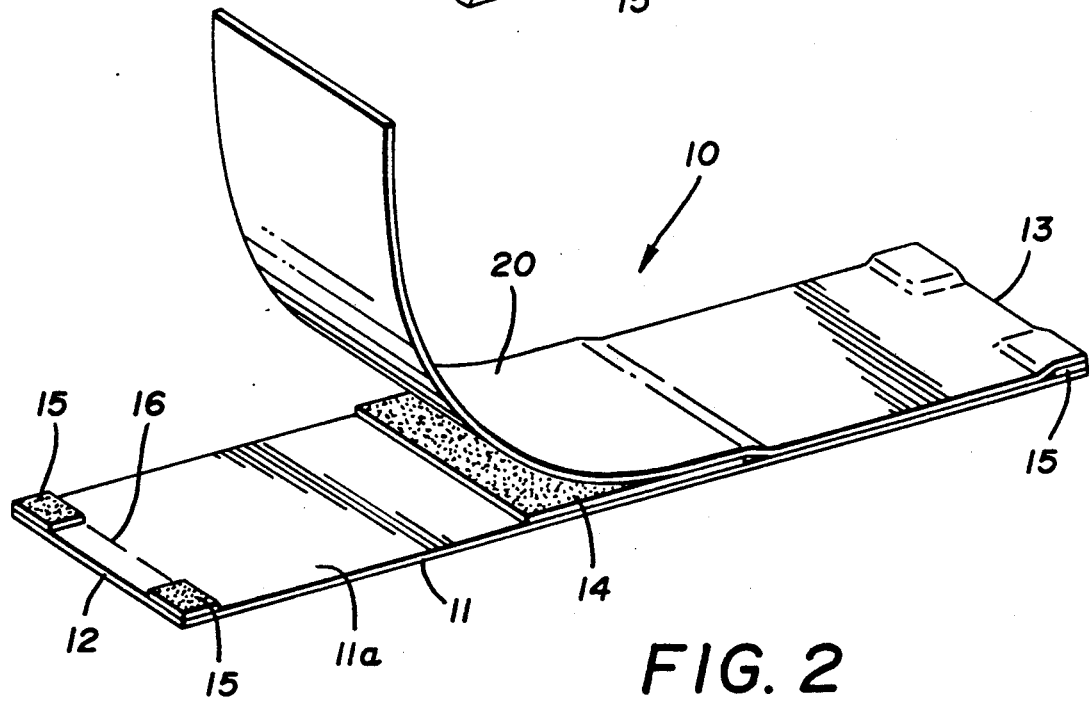
FIG. 2 is a perspective view of the improved insect trapping device prior to installation and in the shipping mode.

As can be seen from FIGS. 1 and 2 of the drawings, the improved insect trapping device includes a body 11 which takes the form of an elongate, flexible strip of material, such as plastic, cardboard, or heavy paper, and which has opposed longitudinal ends 12 and 13.

The body 11 also has opposed first and second surfaces 11a and 11b, respectively, and the first surface 11a has a quantity of insect attracting and trapping adhesive 14 deposited thereon. As illustrated, the quantity of insect attracting and trapping material 14 is disposed on both sides of the longitudinal midpoint of the body 11. The precise extent to which the insect trapping adhesive 14 extends on both sides of the midpoint is, to some degree, optional. A preferred embodiment will be discussed below.

It should be noted, moreover, that the precise insect attracting and trapping adhesive is not specified herein since there are a number of formulations readily available and known to those knowledgeable in the art. Similarly, known insect attracting scents could be added to the material 14 if desired.

Referring particularly then to FIG. 2 of the drawings for a further description of the improved insect trapping device 10, it will be seen that adjacent the first and second ends 12 and 13 of the body 11, there are attachment means 15. As illustrated, the attachment means comprise essentially four short tabs which contain pressure-sensitive adhesive. Obviously, it is within the scope of the invention to extend these tabs to a full strip or to employ more than two of them. They are, however, mounted on the first surface 11a of the body or, in other words, on the same surface on which the insect attracting adhesive 14 is disposed.

Also, the opposed ends 12 and 13 optionally have a transverse score line 16, in the preferred form of the invention, to facilitate bending thereof. These score lines could, however, be omitted if desired.

Finally, a layer of release material 20, such as kraft paper or the like, is disposed in overlying relationship with the first surface 11a and in overlying relationship with the insect attracting adhesive 14 and the attachment means 15 for ease and convenience of shipping, packaging and handling. In that regard, it is contemplated that the improved insect trapping device 10 would normally be shipped and sold in a flat condition, as shown in FIG. 2 of the drawings.

In use or operation of the device, it is first necessary to peel off the release material 20, thereby exposing the insect attracting adhesive 14 and the attachment means 15. It is then simply necessary to bend the flexible body 11 to the configuration illustrated in FIG. 1 of the drawings which will dispose, selectively, either the attachment means 15 on end 12 or the attachment means 15 on end 13 to the support surface or table 30. The attachment means 15 on the remaining end can be secured to the end of the second surface 11b of the body 11 so as to fix the improved device 10 in the position illustrated in FIG. 1 of the drawings.

Of course, in the preferred form of the invention, the attachment means 15 comprise a pressure-sensitive adhesive which permits the device to readily be removed from the surface 30 as desired. It will be understood, however, that other forms of attachment means are contemplated to be within the scope of the invention.

As can be appreciated, the score lines 16 facilitate bending of the ends 12 and 13 so as to present, in the case of the end adjacent the support surface 30, a relatively flat, straight surface to securely mount the device.

As previously mentioned, the insect attracting adhesive 14 preferably does not extend over the entire surface of the body 11. As can be seen, the body typically assumes a tear-drop shape when installed. However, to some extent, the shape will depend upon the material utilized so that, depending upon the material employed, the shape might be more nearly round.

In any event, the insect attracting adhesive 14 will presumably attract the insects and is also sticky to the touch. By extending the quantity of insect attracting adhesive 14 only a limited distance on both sides of the longitudinal midpoint of the body 11, in the event the device becomes somehow inadvertently loosened or detached from the support surface 30, it will simply roll over and the arcuate sidewalls, whether part of an ellipse, circle or other geometric shape, which are bulged out as clearly shown in FIG. 1 of the drawings, will contact the surface 30 thereby avoiding, in most instances, any contact therewith by the adhesive 14.

While a full and complete description of the invention has been set forth in accordance with the dictates of the Patent Statutes, it should be understood that modifications thereof can be resorted to without departing from the spirit hereof or the scope of the appended claims.

What is claimed is:

1. An insect trapping device for mounting on a supporting surface, comprising:
   (a) an elongate, flexible body having first and second surfaces;
   (b) a quantity of insect attracting adhesive disposed on said first surface of said body;
   (c) attachment means disposed on said first surface of said body adjacent each of the opposed ends thereof; and
   (d) said body being foldable so as to dispose said attachment means on one end thereof in contact with the supporting surface and said attachment means on the opposed end in contact with said second surface of said body.

2. The insect trapping device of claim 1 wherein a layer of release material is removably disposed on said first surface of said body in covering relationship with said attachment means and said insect attracting adhesive.

3. The insect trapping device of claim 1 wherein said attachment means include a pressure sensitive adhesive.

4. The insect trapping device of claim 1 wherein said insect attracting adhesive is disposed on only a portion of said body adjacent the longitudinal midpoint thereof.

5. The insect trapping device of claim 1 wherein transverse score lines are disposed on said body adjacent the opposed ends thereof.

6. An insect trapping device for mounting on a supporting surface, comprising:
   (a) an elongate, flexible body having first and second surfaces;
   (b) a quantity of insect attracting adhesive disposed on said first surface of said body;
   (c) attachment means disposed on said first surface of said body adjacent the opposed ends thereof;
   (d) transverse score lines disposed on said body adjacent the opposed ends thereof whereby said body is foldable along said score lines so as to dispose said attachment means on one end thereof in contact with the supporting surface and said attachment means on the opposed end in contact with said second surface of said body.

7. The insect trapping device of claim 6 wherein a layer of release material is removably disposed on said first surface of said body in covering relationship with said attachment means and said insect attracting adhesive.

8. The insect trapping device of claim 6 wherein said attachment means include a pressure sensitive adhesive.

9. The insect trapping device of claim 6 wherein said insect attracting adhesive is disposed on only a portion of said body adjacent the longitudinal midpoint thereof.

* * * * *